(12) United States Patent
Hagen et al.

(10) Patent No.: US 7,588,368 B2
(45) Date of Patent: Sep. 15, 2009

(54) SYSTEM FOR DIAGNOSING TEMPERATURE SENSOR OPERATION IN AN EXHAUST GAS AFTERTREATMENT SYSTEM

(75) Inventors: Eric L. Hagen, Trafalgar, IN (US); Jaideep Prasad, Columbus, IN (US)

(73) Assignee: Cummins Inc., Columbus, IN (US)

( * ) Notice: Subject to any disclaimer, the term of this patent is extended or adjusted under 35 U.S.C. 154(b) by 190 days.

(21) Appl. No.: 11/613,770

(22) Filed: Dec. 20, 2006

(65) Prior Publication Data
US 2008/0151964 A1   Jun. 26, 2008

(51) Int. Cl.
G01K 15/00 (2006.01)
G01K 17/00 (2006.01)
G01K 3/08 (2006.01)

(52) U.S. Cl. .......................... 374/40; 374/29; 374/135; 374/137; 374/152

(58) Field of Classification Search .................. 374/29, 374/40, 100, 137, 144, 147, 135, 152, 112, 374/110, 39, 30
See application file for complete search history.

(56) References Cited

U.S. PATENT DOCUMENTS

| | | | | |
|---|---|---|---|---|
| 2,830,437 | A * | 4/1958 | Woodward | 60/39.281 |
| 3,214,246 | A * | 10/1965 | Ridgway | 422/115 |
| 3,393,562 | A * | 7/1968 | Breedlove | 374/37 |
| 3,732,695 | A * | 5/1973 | Shaw | 60/274 |
| 4,302,943 | A * | 12/1981 | Niemann et al. | 62/49.2 |
| 4,553,852 | A * | 11/1985 | Derderian et al. | 374/1 |
| 4,575,705 | A * | 3/1986 | Gotcher | 338/28 |
| 4,602,872 | A * | 7/1986 | Emery et al. | 374/152 |
| 4,672,566 | A * | 6/1987 | Asano et al. | 702/99 |
| 4,841,780 | A * | 6/1989 | Inada et al. | 73/861.06 |
| 5,177,463 | A * | 1/1993 | Bradshaw et al. | 340/438 |
| 5,255,511 | A * | 10/1993 | Maus et al. | 60/274 |
| 5,341,672 | A * | 8/1994 | Kawanami et al. | 73/64.54 |
| 5,663,899 | A * | 9/1997 | Zvonar et al. | 702/130 |
| 5,837,903 | A * | 11/1998 | Weigand | 73/861.42 |
| 6,236,908 | B1 | 5/2001 | Cheng et al. | |
| 6,446,498 | B1 * | 9/2002 | Schricker et al. | 73/114.74 |
| 6,658,345 | B2 | 12/2003 | Miller | |
| 6,782,743 | B2 * | 8/2004 | Koike et al. | 73/202.5 |
| 6,796,172 | B2 * | 9/2004 | Blakley et al. | 73/204.26 |
| 6,900,756 | B2 | 5/2005 | Salmon | |
| 6,952,639 | B2 * | 10/2005 | Kumar et al. | 701/100 |
| 2004/0020286 | A1 * | 2/2004 | Blakley et al. | 73/204.26 |
| 2006/0137436 | A1 * | 6/2006 | Buck et al. | 73/116 |
| 2007/0047616 | A1 * | 3/2007 | Izumiura et al. | 374/144 |
| 2009/0003405 | A1 * | 1/2009 | Corbet et al. | 374/1 |

* cited by examiner

*Primary Examiner*—Gail Verbitsky
(74) *Attorney, Agent, or Firm*—J. Bruce Schelkopf; Barnes & Thornburg LLP

(57) ABSTRACT

A system and method are provided for diagnosing temperature sensor operation in an exhaust aftertreatment system. Temperature signals from first, second and third temperature sensors and a flow signal are received by a control circuit. The three temperature sensors are positioned in fluid communication with an exhaust flow path fluidly coupled to an exhaust manifold of an internal combustion engine, and the flow signal represents the flow rate of exhaust gas through the exhaust flow path. The control circuit determines average temperature differentials between each of the first, second and third temperature sensors as functions of the flow signal and corresponding ones of the first, second and third temperature signals, and produces a diagnostic fail signal if any of the differences between the average temperature differentials exceed a threshold value.

15 Claims, 3 Drawing Sheets

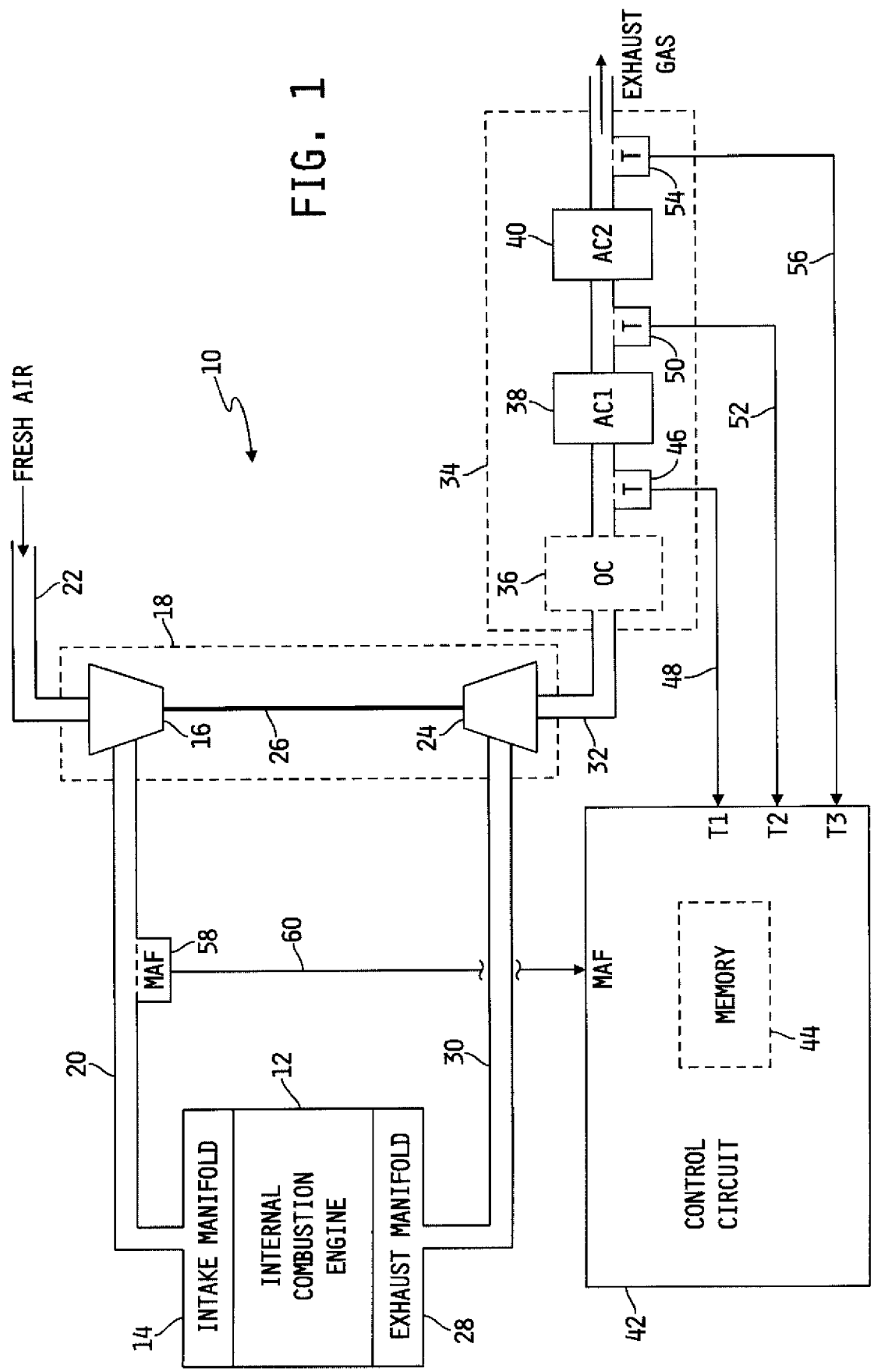

SYSTEM FOR DIAGNOSING TEMPERATURE SENSOR OPERATION IN AN EXHAUST GAS AFTERTREATMENT SYSTEM

FIELD OF THE INVENTION

The present invention relates generally to systems for diagnosing sensor operation, and more specifically to systems for diagnosing operation of a plurality of temperature sensors in an exhaust gas aftertreatment system.

BACKGROUND

Diagnosing operation of a plurality of temperature sensors in an exhaust gas aftertreatment system by directly comparing temperature signals produced by the various sensors with each other may not be practical because two or more of the plurality of temperature sensors may be separated by at least one exhaust gas aftertreatment component, and may therefore be operating within different temperature zones or ranges. It remains, however, desirable to be able to diagnose operation of a plurality of temperature sensors in an exhaust gas aftertreatment system to determine whether the various temperature sensors are operating normally.

SUMMARY

The present invention may comprise one or more of the features recited in the attached claims, and/or one or more of the following features and combinations thereof. Illustratively, a method for diagnosing operation of three temperature sensors is provided. Each sensor is disposed at a different location along a single exhaust flow path fluidly connected to an exhaust manifold of an internal combustion engine. The method may comprise receiving a first temperature signal from a first of the three temperature sensors, receiving a second temperature signal from a second of the three temperature sensors, receiving a third temperature signal from a third of the three temperature sensors, determining an exhaust gas flow rate corresponding to a flow rate of exhaust gas flowing through the single exhaust flow path, determining a first average temperature differential between the first and second temperature sensors as a function of the first temperature signal, the second temperature signal and the exhaust gas flow rate, determining a second average temperature differential between the first and third temperature sensors as a function of the first temperature signal, the third temperature signal and the exhaust gas flow rate, and producing a first fault signal if a difference between the first and second average temperature differentials exceed a threshold value.

The method may further comprise determining a third average temperature differential between the second and third temperature sensors as a function of the second temperature signal, the third temperature signal and the exhaust gas flow rate, and producing a second fault signal if a difference between the first and third average temperature differentials exceed the threshold value. The method may further comprise producing a third fault signal if a difference between the second and third average temperature differentials exceed the threshold value. The method may further comprise producing a diagnostic pass signal if none of the first, second and third fault signals are produced. The method may further comprise producing a diagnostic fail signal if any of the first, second and third fault signals are produced. The method may further comprise isolating one or more failed temperature sensors among the first, second and third temperature sensors as a function of the states of the first, second and fault signals. The method may further comprise monitoring one or more diagnostic enable conditions, and determining the first and second average temperature differentials and producing the first fault signal only if the one or more diagnostic enable conditions are satisfied.

Further illustratively, another method for diagnosing operation of three temperature sensors is provided. Each temperature sensor is disposed at a different location along a single exhaust flow path fluidly connected to an exhaust manifold of an internal combustion engine. The method may comprise receiving a first temperature signal from a first of the three temperature sensors, receiving a second temperature signal from a second of the three temperature sensors, receiving a third temperature signal from a third of the three temperature sensors, determining an exhaust gas flow rate corresponding to a flow rate of exhaust gas flowing through the single exhaust flow path, determining average temperature differentials between each of the first, second and third temperature sensors as functions of the exhaust gas flow rate and corresponding ones of the first, second and third temperature signals, and producing a diagnostic fail signal if any of the differences between the average temperature differentials exceed a threshold value.

The method may further comprise producing a diagnostic pass signal if none of the differences between the average temperature differentials exceed the threshold value. The method may further comprise isolating one or more failed temperature sensors among the first, second and third temperature sensors as a function of which of the differences between the average temperature differentials exceed the threshold value and which of the differences between the average temperature differentials do not exceed the threshold value. The method may further comprise monitoring one or more diagnostic enable conditions, and determining the average temperature differentials and producing the diagnostic fail signal only if the one or more diagnostic enable conditions are satisfied.

A system for diagnosing temperature sensor operation in an exhaust gas aftertreatment system may comprise an exhaust gas flow path fluidly coupled to an exhaust manifold of an internal combustion engine and first and second separate exhaust aftertreatment components each positioned in-line with the exhaust gas flow path with the first exhaust aftertreatment component positioned between the exhaust manifold and the second exhaust aftertreatment component. A first temperature sensor may be configured to produce a first temperature signal and may be positioned in fluid communication with the exhaust gas flow path between the exhaust manifold and the first exhaust aftertreatment component. A second temperature sensor may be configured to produce a second temperature signal and may be positioned in fluid communication with the exhaust gas flow path between first and second exhaust aftertreatment components. A third temperature sensor may be configured to produce a third temperature signal and may be positioned in fluid communication with the exhaust gas flow path downstream of the second exhaust aftertreatment component. Means may be provided for producing a flow signal corresponding to exhaust gas flow through the exhaust gas flow path. A control circuit may include a memory having stored therein instructions executable by the control circuit to determine average temperature differentials between each of the first, second and third temperature sensors as functions of the flow signal and corresponding ones of the first, second and third temperature signals, and to produce a diagnostic fail signal if any of the differences between the average temperature differentials exceed a threshold value.

The instructions executable by the control circuit may further include instructions to determine a first average temperature differential across the first exhaust aftertreatment component as a function of the first temperature signal, the second temperature signal and the flow signal, instructions to determine a second average temperature differential across both of the first and second exhaust aftertreatment components as a function of the first temperature signal, the third temperature signal and the flow signal, and instructions to produce a first fault signal if a difference between the first and second average temperature differentials exceed the threshold value.

The instructions executable by the control circuit may further include instructions to determine a third average temperature differential across the second exhaust aftertreatment component as a function of the second temperature signal, the third temperature signal and the flow signal, and instructions to produce a second fault signal if a difference between the first and third average temperature differentials exceed the threshold value.

The instructions executable by the control circuit may further include instructions to produce a third fault signal if a difference between the second and third average temperature differentials exceeds the threshold value.

The instructions executable by the control circuit may further include instructions to produce the diagnostic fail signal if any of the first, second and third fault signals are produced.

The instructions executable by the control circuit may further include instructions to produce a diagnostic pass signal if none of the first, second and third fault signals are produced.

The instructions executable by the control circuit may further include instructions to isolate one or more failed temperature sensors among the first, second and third temperature sensors as a function of the states of the first, second and fault signals.

The instructions executable by the control circuit may further include instructions to sample the first, second and third temperature signals, to sample the flow signal, and to determine the average temperature differentials based on sampled values of the first, second and third temperature signals and based on sampled values of the flow signal.

The instructions executable by the control circuit may further include instructions to monitor one or more diagnostic enable conditions, and to determine the average temperature differentials and produce the diagnostic fail signal only if the one or more diagnostic enable conditions are satisfied.

BRIEF DESCRIPTION OF THE DRAWINGS

FIG. 1 is a block diagram of an illustrative exhaust gas aftertreatment system for an internal combustion engine.

DESCRIPTION OF THE ILLUSTRATIVE EMBODIMENTS

Figure 2A:
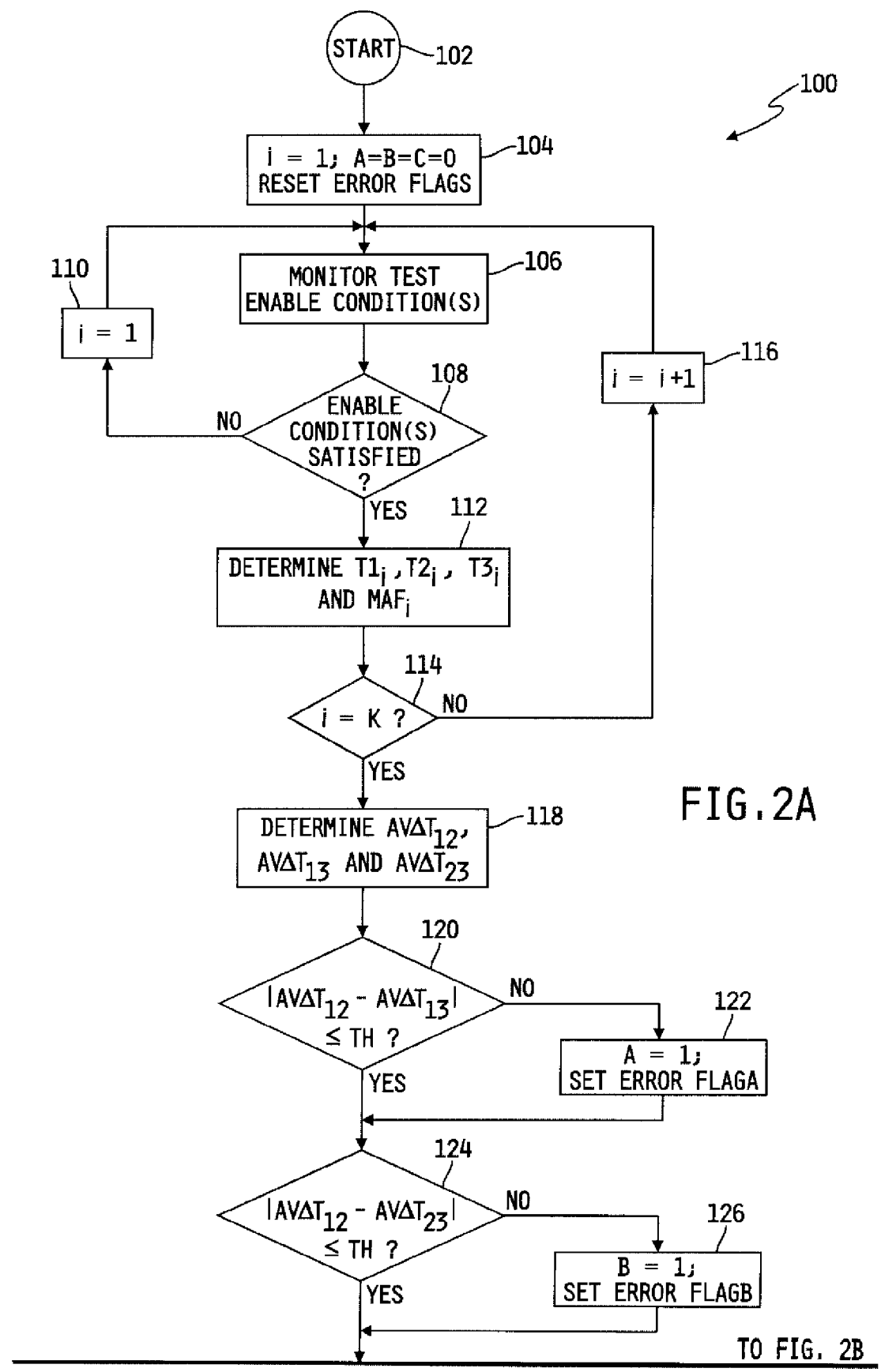
FIGS. 2A and 2B depict a flowchart of one illustrative embodiment of a software algorithm for diagnosing operation of the temperature sensors in the exhaust gas aftertreatment system of FIG. 1.

For the purposes of promoting an understanding of the principles of the invention, reference will now be made to a number of illustrative embodiments shown in the attached drawings and specific language will be used to describe the same.

Referring now to FIG. 1, one illustrative embodiment of a system 10 for diagnosing temperature sensor operation in an exhaust gas aftertreatment system is shown. In the illustrated embodiment, the system 10 includes an internal combustion engine 12 having an intake manifold 14 fluidly coupled to a fresh air outlet of a compressor 16 of a turbocharger 18 via a conduit 20. A fresh air inlet of the compressor 16 is fluidly coupled to a fresh air intake conduit 22. A turbine 24 of the turbocharger 18 is mechanically coupled via a rotational drive shaft 26 to the compressor 16 in a conventional manner. An exhaust gas inlet of the turbine 24 is fluidly coupled to an exhaust manifold 28 of the engine 12 via an exhaust gas conduit 30. An exhaust gas outlet of the turbine 24 is fluidly coupled to an exhaust gas inlet of an exhaust gas aftertreatment system 34 via an exhaust gas conduit 32.

In the illustrated embodiment, the exhaust gas aftertreatment system 34 may include a conventional oxidation catalyst (OC) 36 that is disposed in-line with the exhaust gas conduit 32 as shown in phantom in FIG. 1, although the oxidation catalyst 36 may be omitted in other embodiments. If included in the system 34, such a diesel oxidation catalyst 36 includes a conventional catalyst element responsive to hydrocarbons introduced into the exhaust gas stream to elevate the temperature of the exhaust gas to a temperature suitable for regeneration of one or more downstream exhaust gas aftertreatment components.

In the embodiment illustrated in FIG. 1, two exhaust gas aftertreatment components 38 and 40 are shown disposed in-line with the exhaust gas conduit 32 between the OC 36 and ambient, or in embodiments that do not include the OC 36, between the exhaust gas outlet of the turbine 24 and ambient. The exhaust gas aftertreatment components 38 and 40 may each be or comprise any conventional exhaust gas aftertreatment component, and the components 38 may be alike or different in their construction and/or function. In one exemplary embodiment, for example, the exhaust gas aftertreatment component 38 is a conventional NOx adsorber catalyst (NAC), and the exhaust gas aftertreatment component 40 is a conventional diesel particulate filter (DPF). In any case, the aftertreatment system 34 may include more exhaust gas aftertreatment components than those illustrated in FIG. 1, and/or different exhaust gas aftertreatment components from just described.

The system 10 further includes a control circuit 42 configured to control the overall operation of the engine 12. In one embodiment, the control circuit 42 is a microprocessor-based control circuit typically referred to as an electronic or engine control module (ECM), or electronic or engine control unit (ECU). It will be understood, however, that the control circuit 42 may generally be or include one or more general purpose or application specific control circuits arranged and operable as will be described hereinafter. The control circuit 42 includes, or is coupled to, a memory unit 44 that stores therein a number of software algorithms executable by the control circuit 42 to control various operations of the engine 12.

The control circuit 42 includes a number of inputs configured to receive sensory data corresponding to one or more operating parameters of the engine 12 and/or exhaust gas aftertreatment system 34. For example, the system 10 includes a mass air flow sensor 58 that is electrically connected to a mass air flow input (MAF) of the control circuit 42 via a signal path 60. The mass air flow sensor 50 may be of conventional construction, and is configured to produce a signal on the signal path 60 that is indicative of the mass flow rate of fresh air being supplied by the compressor 16 of the turbocharger 18 to the intake manifold 14 of the engine 12.

The exhaust gas aftertreatment system 34 includes a number of temperature sensors positioned in fluid communication with the exhaust gas conduit 32 and electrically connected to corresponding inputs of the control circuit 42. For example, a temperature sensor 46 is positioned in fluid communication with the exhaust gas conduit 32 between the OC 36 and the exhaust gas aftertreatment component 38 in embodiments that include the OC 36, and between the exhaust gas outlet of the turbine 24 and the exhaust gas aftertreatment component 38 in embodiments that do not include the OC 36, and is electrically connected to an exhaust gas temperature input, T1, of the control circuit 42 via a signal path 48. Another temperature sensor 50 is positioned in fluid communication with the exhaust gas conduit 32 between the exhaust gas aftertreatment component 38 and the exhaust gas aftertreatment component 40, and is electrically connected to an exhaust gas temperature input, T2, of the control circuit 42 via a signal path 52. Yet another temperature sensor 54 is positioned in fluid communication with the exhaust gas conduit 32 between the exhaust gas aftertreatment component 40 and ambient, and is electrically connected to an exhaust gas temperature input, T3, of the control circuit 42 via a signal path 56. Because each of the three temperature sensors 46, 50 and 54 are separated by at least one exhaust gas aftertreatment component 38 and/or 40, the temperature environments in which each of the temperature sensors 46, 50 and 54 operate is likely different.

Figure 2B:
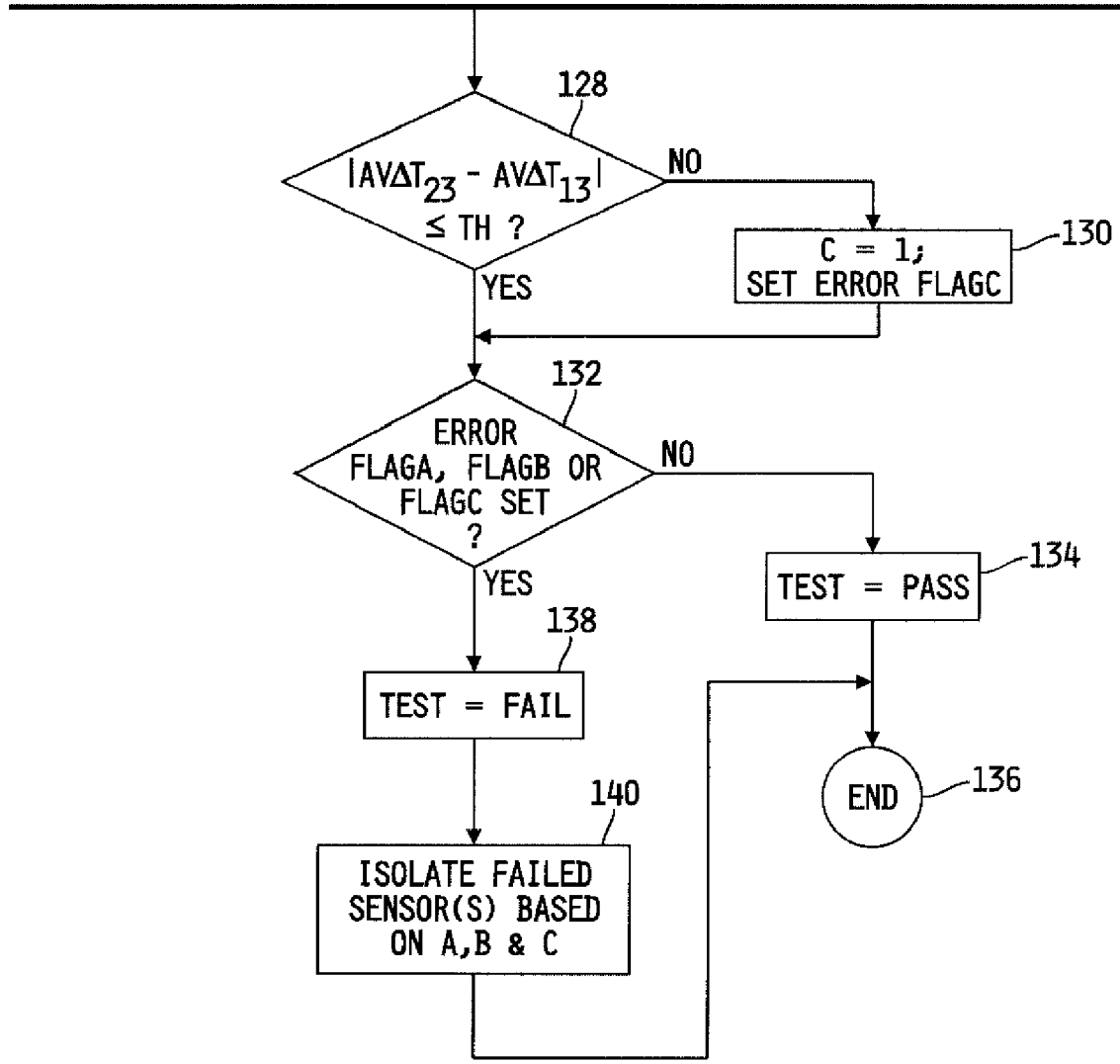

Referring now to FIGS. 2A and 2B, a flowchart of one illustrative embodiment of a software algorithm 100 for diagnosing operation of the temperature sensors 46, 50 and 54 in the exhaust gas aftertreatment system 34 of FIG. 1 is shown. The software algorithm 100 can be stored in the memory unit 44 in the form of instructions that are executable by the control circuit 42 to diagnose operation of the temperature sensors 46, 50 and 54. The algorithm begins at step 102, and thereafter at step 104 the control circuit 42 is operable to reset a number of counters and error flags. In the illustrated example, the control circuit 42 is operable at step 104 to set a counter i=1, to set status variables A=B=C=0, and to reset all error flags relating to the temperature sensor diagnostic algorithm 100. Thereafter at step 106, the control circuit 42 is operable to monitor a number of test enable condition(s), i.e., one or more engine and/or aftertreatment system operating conditions that must be met in order to continue with the diagnostic algorithm 100. Examples of test enable conditions may include, but are not limited to the engine 12 operating at steady state and regeneration of either of the aftertreatment components 38 and 40 not current active. Those skilled in the art will recognize alternative and/or additional test enable conditions, and any such test enable conditions are contemplated by this disclosure. In any case, execution of the algorithm 100 advances from step 106 to step 108 where the control circuit 42 is operable to determine whether all of the test enable conditions that were monitored at step 106 are satisfied. If not, the control circuit 42 is operable to reset the counter i=1 at step 110, and to then loop back to step 106. If, at step 108, the control circuit 42 determines that all of the test enable conditions monitored at step 106 are satisfied, algorithm execution advances to step 112.

At step 112, the control circuit 42 is operable to determine the operating temperatures of the temperature sensors 46, 50 and 54, as well as the current mass flow rate of the exhaust gas flowing through the exhaust gas conduit 32. It is generally known that the mass flow rate of the exhaust gas is equal to the mass flow rate of intake air supplied to the intake manifold 14, and the mass flow rate signal produced by the mass flow rate sensor 58 is illustratively used by the control circuit 42 as the exhaust gas mass flow rate. In the illustrated embodiment, the control circuit 42 is operable to execute step 112 by sampling the temperature signals produced by the various temperature sensors 46, 50 and 54, corresponding to the temperature values $T1_i$, $T2_i$ and $T3_i$, and by sampling the flow rate signal produced by the mass air flow sensor, corresponding to the mass flow rate value $MAF_i$. Thereafter at step 114, the control circuit 42 determines whether the counter value, i, is equal to a predetermined count value, k. If not, algorithm execution advances to step 116 where the counter value, i, is incremented by one before looping back to step 106. If, at step 114, the control circuit determines at step 114 that i=k, this indicates that a total of "k" temperature and mass air flow values have been captured while the test enable conditions were satisfied, and algorithm execution advances to step 118.

At step 118, the control circuit 42 is operable to compute average temperature differentials between the three temperature sensors 46, 50 and 54 as functions of appropriates pairs of each of the "k" temperature samples and of the "k" mass air flow rate samples. For example, the average temperature differential, $AV\Delta T_{12}$, between the temperature sensors 46 and 50 is illustratively computed by the control circuit 42 at step 118 according to the equation:

$$AV\Delta T_{12} = \Sigma^k_{j=1}[(T1_j - T2_j)*MAF_j]/\Sigma^k_{j=1}MAF_j \quad (1).$$

Likewise, the average temperature differential, $AV\Delta T_{13}$, between the temperature sensors 46 and 54 is illustratively computed by the control circuit 42 at step 118 according to the equation:

$$AV\Delta T_{13} = \Sigma^k_{j=1}[(T1_j - T3_j)*MAF_j]/\Sigma^k_{j=1}MAF_j \quad (2),$$

and the average temperature differential, $AV\Delta T_{23}$, between the temperature sensors 50 and 54 is illustratively computed by the control circuit 42 at step 118 according to the equation:

$$AV\Delta T_{23} = \Sigma^k_{j=1}[(T2_j - T3_j)*MAF_j]/\Sigma^k_{j=1}MAF_j \quad (3).$$

Following step 118, execution of the algorithm 100 advances to step 120 where the control circuit 42 is operable to determine whether an absolute difference between the average temperature differentials computed according to equations (1) and (2) is less than or equal to a threshold value, TH. Generally, the differences between the average temperature differentials computed according to equations (1)-(3) should be close to zero, so the threshold value, TH, may accordingly be set to some tolerable value above zero. In any case, if the control circuit 42 determines at step 120 that the difference between the average temperature differentials computed according to equations (1) and (2) is greater than TH, algorithm execution advances to step 122 where the control circuit 42 is operable to set the status variable "A" equal to 1, and to set an error FLAGA in the memory unit 44.

Following step 122 and the "YES" branch of step 120, execution of the algorithm 100 advances to step 124 where the control circuit 42 is operable to determine whether an absolute difference between the average temperature differentials computed according to equations (1) and (3) is less than or equal to the threshold value, TH. If so, algorithm execution advances to step 126 where the control circuit 42 is operable to set the status variable "B" equal to 1, and to set an error FLAGB in the memory unit 44.

Following step 126 and the "YES" branch of step 124, execution of the algorithm 100 advances to step 128 where the control circuit 42 is operable to determine whether an absolute difference between the average temperature differentials computed according to equations (2) and (3) is less than or equal to the threshold value, TH. If so, algorithm execution advances to step 130 where the control circuit 42 is operable to set the status variable "C" equal to 1, and to set an error FLAGC in the memory unit 44.

Following step 130 and the "YES" branch of step 128, execution of the algorithm 100 advances to step 132 where the control circuit 42 is operable to determine whether any of the error flags, FLAGA, FLAGB or FLAGC, is set. If not, execution of the algorithm 100 advances to step 134 where the control circuit sets a diagnostic indicator "TEST" to "PASS" in the memory unit 44 to indicate that the control circuit 42 determined, according to the temperature sensor diagnostic algorithm 100, that the temperature sensors 46, 50 and 54 are operating normally. Thereafter at step 136, the algorithm 100 ends. Alternatively, the algorithm 100 may loop from step 134 back to step 104 to repeat the diagnostic algorithm 100.

If, at step 132, the control circuit 42 determines that one or more of the error flags, FLAGA, FLAGB and FLAGC, is/are set, algorithm execution advances to step 138 where the control circuit 42 sets a diagnostic indicator "TEST" to "FAIL" in the memory unit 44 to indicate that the control circuit 42 determined, according to the temperature sensor diagnostic algorithm 100, that one or more of the temperature sensors 46, 50 and 54 is/are not operating normally, i.e., failing or malfunctioning. Thereafter at step 140, the control circuit 42 is operable to process the error flag information; that is the statuses of the various error flags, FLAGA, FLAGB and FLAGC, to determine which one or more of the three temperature sensors 46, 50 and 54 is/are failing or malfunctioning. In one illustrative embodiment, the control circuit 42 is operable to compare the statuses of the error flags, FLAGA, FLAGB and FLAGC, to a truth table to determine which one or more of the temperature sensors 46, 50 and 54 is/are failing or malfunctioning. The following temperature sensor failure isolation table illustrates one example table for comparing the statuses of the various error flags, FLAGA, FLAGB and FLAGC, to determine which of the one or more temperature sensors 46, 50 and 54 is/are failing or malfunctioning:

TEMPERATURE SENSOR FAILURE ISOLATION TABLE

| A | B | C | Failed Sensor(s) |
|---|---|---|---|
| 0 | 0 | 0 | None (No Failures) |
| 0 | 0 | 1 | Indeterminate |
| 0 | 1 | 0 | Indeterminate |
| 0 | 1 | 1 | T1 (46) |
| 1 | 0 | 0 | Indeterminate |
| 1 | 0 | 1 | T2 (50) |
| 1 | 1 | 0 | T3 (54) |
| 1 | 1 | 1 | Multiple Sensor Failures |

Those skilled in the art will recognize other conventional techniques, statistical or otherwise, for comparing the statuses of the error flags, FLAGA, FLAGB and FLAGC, to isolate the one or more temperature sensors 46, 50 and 54 that is/are failing or malfunctioning, and such other conventional techniques are contemplated by this disclosure. In any case, execution of the algorithm 100 advances from step 140 to step 136 where execution of the algorithm 100 ends. Alternatively, execution of the algorithm 100 may loop from step 140 back to step 104 to repeat the diagnostic algorithm 100.

Because the temperature sensor 46 in FIG. 1 is closer to the engine than the temperature sensors 50 and 54, the temperature of the exhaust gas flowing past the sensor 46 changes more rapidly and to greater extents than the temperature of the exhaust gas flowing past the temperature sensors 50 and 54. The temperature sensor 46 will generally experience short periods of high exhaust flow and high exhaust gas temperatures followed by longer periods of lower exhaust gas flow and lower exhaust gas temperatures. The temperature sensors 50 and 54 will experience the same spikes in exhaust gas flow, but because of the temperature damping effects of the exhaust gas aftertreatment catalysts 38 and 40, the temperature sensors 50 and 54 will not experience the same peaks and valleys of exhaust gas temperature experience by the temperature sensor 46. Rather, the temperature sensors 50 and 54 will experience less elevated exhaust gas temperatures for longer periods of time.

By using the mass flow rate of the exhaust, in the form of the mass flow rate of intake air supplied to the engine 12 via the intake manifold 12, in equations (1)-(3) to weight brief periods of high exhaust gas flow and high exhaust gas temperatures more heavily than longer periods of lower exhaust gas flow and lower exhaust gas temperatures, by computing the average temperature differentials of equations (1)-(3) over sufficiently long time periods, and by comparing the resulting average temperature differentials to each other, the algorithm 100 is able to comparatively diagnose operation of the three temperature sensors 46, 50 and 54 by comparing thermal energy (heat) that passes by each of the temperature sensors.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method for diagnosing operation of three temperature sensors each disposed at a different location along a single exhaust flow path fluidly connected to an exhaust manifold of an internal combustion engine, the method comprising:
   receiving a first temperature signal from a first of the three temperature sensors,
   receiving a second temperature signal from a second of the three temperature sensors,
   receiving a third temperature signal from a third of the three temperature sensors,
   determining an exhaust gas flow rate corresponding to a flow rate of exhaust gas flowing through the single exhaust flow path,
   determining a first average temperature differential between the first and second temperature sensors as a function of the first temperature signal, the second temperature signal and the exhaust gas flow rate,
   determining a second average temperature differential between the first and third temperature sensors as a function of the first temperature signal, the third temperature signal and the exhaust gas flow rate, and
   producing a first fault signal if a difference between the first and second average temperature differentials exceed a threshold value.

2. The method of claim 1 further comprising:
   determining a third average temperature differential between the second and third temperature sensors as a function of the second temperature signal, the third temperature signal and the exhaust gas flow rate, and
   producing a second fault signal if a difference between the first and third average temperature differentials exceed the threshold value.

3. The method of claim 2 further comprising producing a third fault signal if a difference between the second and third average temperature differentials exceed the threshold value.

4. The method of claim 3 further comprising setting a diagnostic test indicator in a memory unit to pass if none of the first, second and third fault signals are produced.

5. The method of claim 3 further comprising setting a diagnostic test indicator in a memory unit to fail if any of the first, second and third fault signals are produced.

6. The method of claim 3 further comprising isolating one or more failed temperature sensors among the first, second and third temperature sensors as a function of the states of the first, second and fault signals.

7. The method of claim 1 further comprising:
monitoring one or more test enable conditions, and
determining the first and second average temperature differentials and producing the first fault signal only if the one or more test enable conditions are satisfied.

8. The method of claim 1 wherein the first temperature sensor is positioned between the exhaust manifold and a first exhaust aftertreatment component disposed in-line with the exhaust gas flow path, the second temperature sensor is positioned between the first exhaust aftertreatment component and a second exhaust aftertreatment component disposed in-line with the exhaust flow path downstream of the first exhaust after treatment component, and the third temperature sensor is positioned downstream of the second exhaust aftertreatment component,
and wherein the method further comprises:
monitoring one or more test enable conditions, and
determining the first and second average temperature differentials and producing the first fault signal only if the one or more test enable conditions are satisfied.

9. The method of claim 2 wherein the first temperature sensor is positioned between the exhaust manifold and a first exhaust aftertreatment component disposed in-line with the exhaust gas flow path, the second temperature sensor is positioned between the first exhaust aftertreatment component and a second exhaust aftertreatment component disposed in-line with the exhaust flow path downstream of the first exhaust after treatment component, and the third temperature sensor is positioned downstream of the second exhaust aftertreatment component,
and wherein the method further comprises:
determining a third average temperature differential between the second and third temperature sensors as a function of the second temperature signal, the third temperature signal and the exhaust gas flow rate, and
producing a second fault signal if a difference between the first and third average temperature differentials exceed the threshold value.

10. The method of claim 3 wherein the first temperature sensor is positioned between the exhaust manifold and a first exhaust aftertreatment component disposed in-line with the exhaust gas flow path, the second temperature sensor is positioned between the first exhaust aftertreatment component and a second exhaust aftertreatment component disposed in-line with the exhaust flow path downstream of the first exhaust after treatment component, and the third temperature sensor is positioned downstream of the second exhaust aftertreatment component,
and wherein the method further comprises producing a third fault signal if a difference between the second and third average temperature differentials exceed the threshold value.

11. A method for diagnosing operation of three temperature sensors each disposed at a different location along a single exhaust flow path fluidly connected to an exhaust manifold of an internal combustion engine, the method comprising:
receiving a first temperature signal from a first of the three temperature sensors,
receiving a second temperature signal from a second of the three temperature sensors,
receiving a third temperature signal from a third of the three temperature sensors,
determining an exhaust gas flow rate corresponding to a flow rate of exhaust gas flowing through the single exhaust flow path,
determining average temperature differentials between each of the first, second and third temperature sensors as functions of the exhaust gas flow rate and corresponding ones of the first, second and third temperature signals, and
setting a diagnostic test indicator in a memory unit to fail if any of the differences between the average temperature differentials exceed a threshold value.

12. The method of claim 11 further comprising setting a diagnostic test indicator in a memory unit to pass if none of the differences between the average temperature differentials exceed the threshold value.

13. The method of claim 11 further comprising isolating one or more failed temperature sensors among the first, second and third temperature sensors as a function of which of the differences between the average temperature differentials exceed the threshold value and which of the differences between the average temperature differentials do not exceed the threshold value.

14. The method of claim 11 further comprising:
monitoring one or more test enable conditions, and
determining the average temperature differentials and producing the diagnostic fail signal only if the one or more test enable conditions are satisfied.

15. The method of claim 11 wherein the first temperature sensor is positioned between the exhaust manifold and a first exhaust aftertreatment component disposed in-line with the exhaust gas flow path, the second temperature sensor is positioned between the first exhaust aftertreatment component and a second exhaust aftertreatment component disposed in-line with the exhaust flow path downstream of the first exhaust after treatment component, and the third temperature sensor is positioned downstream of the second exhaust aftertreatment component,
and wherein the method further comprises setting a diagnostic test indicator in a memory unit to pass if none of the differences between the average temperature differentials exceed the threshold value.

* * * * *